Fig. 1

Nick A. Schuster
INVENTOR

BY Edward M Roney
ATTORNEY

Nick A. Schuster
INVENTOR

BY Edward M. Roney
ATTORNEY

Nick A. Schuster
INVENTOR

BY Edward M. Roney
ATTORNEY

Nick A. Schuster
INVENTOR

BY Edward M. Roney
ATTORNEY

Nick A. Schuster
INVENTOR

BY Edward M. Roney
ATTORNEY

United States Patent Office 3,457,497
Patented July 22, 1969

3,457,497
METHODS AND APPARATUS FOR IMPROVING THE RESOLUTION OF WELL LOGGING MEASUREMENTS INCLUDING SIGNAL CORRECTION
Nick A. Schuster, Houston, Tex., assignor to Schlumberger Technology Corporation, Houston, Tex., a corporation of Texas
Filed June 5, 1967, Ser. No. 643,559
Int. Cl. G01v 3/18
U.S. Cl. 324—1       22 Claims

ABSTRACT OF THE DISCLOSURE

This disclosure describes techniques utilized in connection with signal processing apparatus, for processing well logging signals derived from a downhole investigating apparatus, of the type where a computed output signal is stored and subsequently read out for combination with the derived well logging signals in a prescribed manner. Techniques are described for correcting selected computed signals based on the fact that the activity level of the derived signals has attained a selected threshold value. The signals utilized for correcting the computed signals may take the form of previously derived signals or averaged signals.

---

This invention relates to signal processing methods and apparatus for processing well logging measurement signals for providing improved indications of subsurface conditions or characteristics.

In the logging of subsurface earth formations surrounding a borehole drilled into the earth, investigating apparatus is moved through the borehole and investigates the surrounding earth formations to provide an output signal which varies in accordance with variations of the investigated characteristic of the adjoining earth formations. In electrical logging, for example, the output signal varies in accordance with the electrical resistivity or conductivity of the subsurface earth formations. In any case, it is often desirable that the investigating apparatus respond to only a relatively limited portion of the formation material which is adjacent the apparatus at any given instant. For example, it is frequently desired that the vertical resolution of the investigating apparatus be sensitive to only a limited vertical interval of the adjoining earth formations. By so doing, earth formation beds can be more accurately investigated.

When speaking of vertical resolution of an investigating apparatus, the vertical geometrical factor (hereinafter called V.G.F.) is frequently utilized to more accurately describe this vertical resolution. The V.G.F. of an induction logging type investigating apparatus, for example, can be defined as the relative response of the investigating apparatus as a function of relative borehole depth as the investigating apparatus passes from $-\infty$ to $+\infty$ through a thin conductive bed extending radially outward from the borehole to infinity and surrounded by beds of zero conductivity. To make it easier to use, the V.G.F. is usually normalized to "one." Thus, $$\int_{-\infty}^{+\infty} X dz$$

is made equal to "one" where X is the relative response and $dz$ is a depth increment along the borehole axis. This same procedure can be used to find the V.G.F. if other formation characteristics than conductivity (or its reciprocal, resistivity) are being investigated, i.e., if other than induction logging type investigating apparatus is being utilized.

However, many investigating apparatus respond to a greater vertical region than desired (i.e., they do not have the most desirable V.G.F.). One technique for correcting this is to provide additional transducer elements in the downhole investigating apparatus to compensate for or to cancel the undesired portion of the response so that the effective vertical resolution of the apparatus is substantially improved. For example, in logging by electromagnetic principles, which is referred to as "induction logging," so-called "focusing" coils are added to the downhole investigating apparatus to cancel to a large extent the response of the apparatus to the so-called "shoulder" regions lying immediately above and below the desired vertical region of response of the investigating apparatus. However, further problems arise whenever additional transducer elements are added. One such problem is that more apparatus must be placed in the downhole investigating apparatus thus making the downhole investigating apparatus more complex and usually more expensive. Because of hostile environment downhole, it is desirable to move complexities to the surface. Other problems concerning the quality of the measurement may also occur. For example, in induction logging, as more coils are added to improve the vertical focusing, the depth of investigation of the apparatus in a horizontal or radial direction tends to decrease.

Another way of improving the effective vertical resolution of the downhole investigating apparatus is by utilizing the signal processing or computing techniques set forth in U.S. Patent No. 3,166,709 granted to H. G. Doll on Jan. 19, 1965. This Doll patent teaches the principle of temporarily storing or memorizing well logging signals obtained at various vertically spaced depth levels in the borehole. These stored signals are then combined in an appropriate manner to produce a resultant signal corresponding to the signal that would have been obtained with an investigating apparatus having better vertical resolution. This process is sometimes referred to as "computed focusing." The resultant signal is a computed signal and the relative depth levels corresponding to the stored signals which are being combined at any given instant are called computing stations. These computing stations are defined relative to the investigating apparatus, and therefore effectively move through the borehole as the investigating apparatus moves through the borehole. The relative depth level to which the resultant signal is referenced is called the center point or recording point of the investigating system.

In following the teachings of the above-named Doll patent, it would sometimes be desirable to provide computing stations at a large number of measurement levels in the borehole such as in those cases where the total signal received by the investigating apparatus is made up of contributions from a relatively great distance from the center point or recording point of the downhole investigating apparatus. However, to accomplish this, a relative large capacity memory would be required to store the necessary number of well logging measurement signal samples.

Other ways of improving the vertical resolution by signal processing techniques are the techniques shown in copending application Ser. No. 605,424 by Nick A. Schuster, filed on Dec. 28, 1966, copending application Ser. No. 643,560 by Nick A. Schuster, entitled "Methods and Apparatus for Processing Well Logging Measurements," filed on June 5, 1967, and copending application Ser. No. 643,581 by Denis R. Tanguy, entitled "Methods and Apparatus for Processing Well Logging Measurements," filed on June 5, 1967. Among other things, these techniques enable the use of a much larger effective number of computing stations for a memory system of given capacity. In a more general sense they enable more sophisticated forms of signal processing to be performed with relatively small memory systems of convenient size for use at the well site. Utilizing the signal processing techniques of the last three mentioned copending applications, any errors introduced into the signal processing system will be quickly eliminated for investigating apparatus having many types of V.G.F.'s.

However, some investigating apparatus may have V.G.F.'s which do not lend themselves to this automatic cancellation of errors. The present application describes a technique which can be utilized in accordance with the previous Schuster and Tanguy copending applications to correct for errors which have crept into the signal processing system.

It is an object of the invention therefore, to provide new and improved methods and apparatus for processing well logging measurement signals wherein more accurate measurements can be obtained.

It is another object of the invention to provide new and improved methods and apparatus for processing well logging measurement signals wherein errors induced into the signal processing system can be corrected.

In accordance with one feature of the present invention, apparatus for processing well logging signals comprises means for deriving signals representative of a characteristic of earth formations surrounding a borehole at different depth levels throughout the borehole and means for combining each derived signal with at least one other signal to provide computed signals. The apparatus further comprises memory means for storing the computed signals and means for reading out the computed signals from the memory means at later times and supplying at least one of the computed signals to the combining means to be combined with each derived signal. These read-out computed signals operate to cancel out a selected portion of the formation response of each derived signal (i.e., cancel out a selected portion of the derived signal V.G.F.) so that the computed signals will each have a sharper formation response or V.G.F. The apparatus further comprises means responsive to the rate of change of the derived signals as a function of depth for correcting at least one of the computed signals so as to provide more accurate representations of the characteristic of the surrounding earth formations.

In accordance with another feature of the present invention, a method of processing well logging signals comprises deriving signals representative of a characteristic of earth formations surrounding a borehole at different depth levels throughout the borehole and combining each derived signal with at least one other signal to provide computed signals. The method further comprises storing the computed signals and reading out the computed signals at later times and supplying at least one of the computed signals to be combined with each derived signal so as to produce a shaper V.G.F. for each computed signal. The method further comprises correcting at least one of the computed signals in response to the rate of change of the derived signals as a function of depth so as to provide more accurate representations of the characteristic of the surrounding earth formations.

For a better understanding of the present invention, together with other and further objects thereof, reference is had to the following description taken in connection with the accompanying drawings, the scope of the invention being pointed out in the appended claims.

Referring to the drawings.

Figure 1:
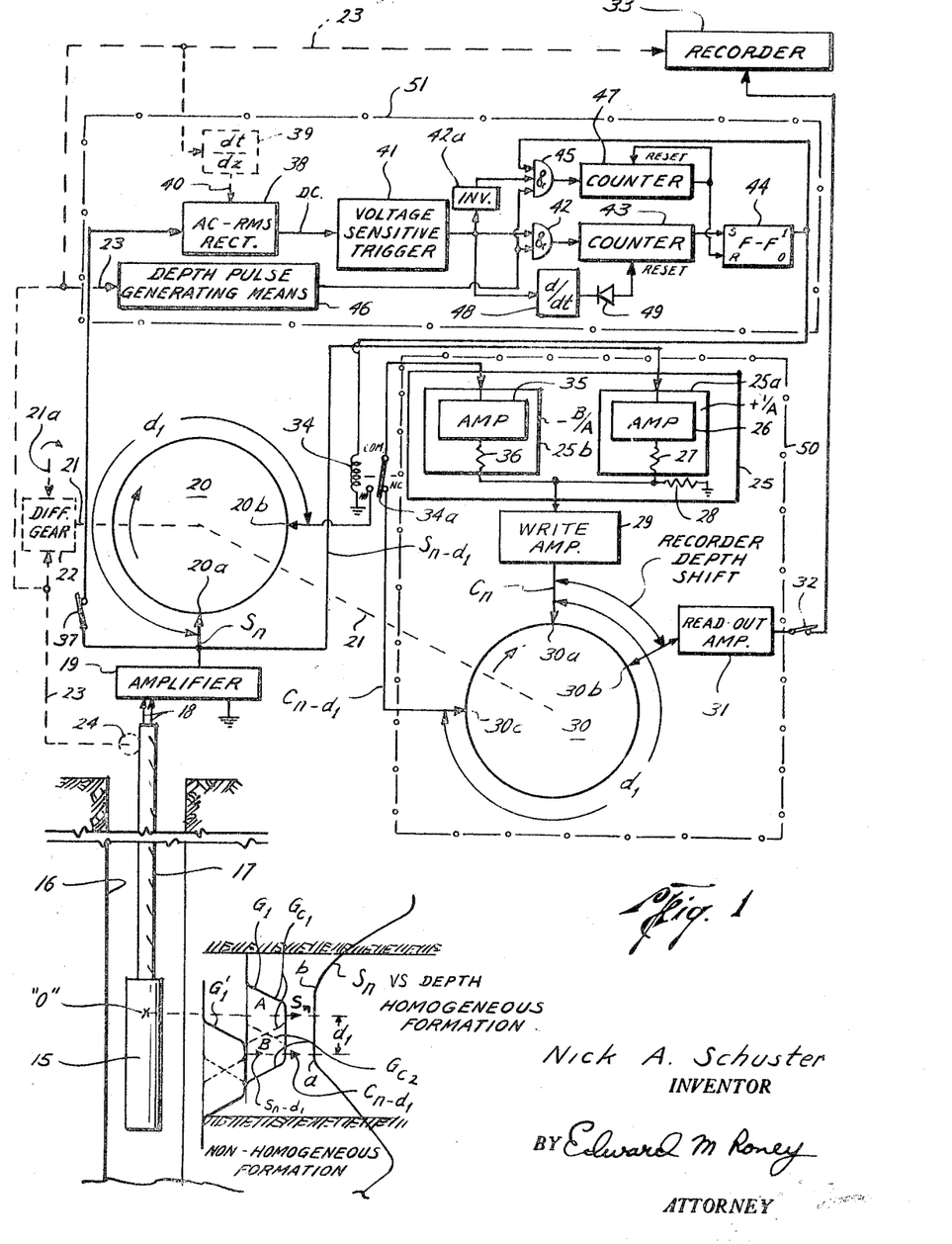
FIGURE 1 shows a downhole investigating apparatus in a borehole along with a schematic representation of one embodiment of electrical circuitry for processing well logging signals derived from a downhole well logging apparatus in accordance with the present invention.

Referring now to FIGURE 1, there is shown a downhole investigating apparatus 15, having a measurement center point or recording point "0," supported in a borehole 16 on the end of a cable 17. Shown opposite the investigating apparatus 15 is a V.G.F. $G_1$ having two V.G.F. portions $G_{c_1}$ and $G_{c_2}$ of areas A and B, respectively. The V.G.F. $G_1$, since it represents the response of the investigating apparatus 15, in effect moves through the borehole with the investigating apparatus 15 and thus, the recording point of the V.B.F. $G_1$, represented by the arrow $S_n$, is at the same depth level as the investigating apparatus measurement recording point "0." The V.G.F. $G_1'$ located somewhat below and to the left of V.G.F. $G_1$ represents the V.G.F. $G_1$ an interval $d_1$ in the downhole direction. In this application, an arrow emanating from a V.G.F. designates that V.G.F.'s recording depth point and the letter designation with the arrow gives the signal designation for the V.G.F. or V.G.F. component. The subscript "$n$" with the signal designations represents a signal corresponding to the present position of the downhole investigating apparatus. If a signal has a subscript "$n-d$," this means that the signal corresponds to the investigating apparatus being a depth interval "$d$" downhole.

The signals derived from downhole investigating apparatus 15, which are in the form of varying DC signals, are supplied to the surface of the earth via a conductor pair 18 which passes through the armored multiconductor cable 17, to the input of an amplifier 19. Amplifier 19, along with amplifying the derived signals, provides the ground reference potential for the surface signal processing apparatus, and therefore could comprise a differential amplifier, for example. The output of amplifier 19, which is designated $S_n$ is supplied to a write-in contact 20a of a suitable memory device 20. Memory device 20 is represented in FIGURE 1 as a rotating memory which could, for example, comprise a suitable rotating magnetic memory like the one shown in the above-mentioned Doll patent or a rotating capacitor memory of the type shown in U.S. Patent No. 3,181,117, granted to W. J. Sloughter on Apr. 27, 1965. Alternatively, rotating memory 20 could comprise the capacitor memory with suitable switching circuits as shown in the above-named Doll patent.

Rotating memory 20 is driven in a clockwise direction by a shaft 21 from a differential gear 22, the input to differential gear 22 coming from a shaft 23 which is connected to a suitable rotating wheel 24, which rotates in accordance with the movement of the cable 17 in and out of the borehole. Another shaft 22a, which can be rotated by hand, is also connected to the input of differential gear 22. Located a clockwise interval $d_1$ from write-in contact 20a is a read-out contact 20b which supplies the read-out derived signal $S_{n-d_1}$ to a normally open contact of a switch 34a driven by a relay solenoid 34.

The derived signal $S_n$ is also supplied to a weighting function circuit 25a, having a weight of $1/A$, of weighted adding network 25. The weighting function circuit 25a comprises a suitable amplifier 26 and resistor 27, the output of weighting function circuit 25a being connected to a low value resistor 28 to ground. The computed output signal $C_n$ from weighted adding network 25, taken across the low value resistor 28, is supplied through a suitable write-in amplifier 29 to a write-in contact 30a of another rotating memory 30. Rotating memory 30 is driven in a clockwise direction by the shaft 21. Located a clockwise interval on the periphery of memory 30, designated "recorder depth shift," is a read-out point 30b which supplies the stored computed signal $C_n$ through a suitable read-out amplifier 31 and single-throw switch 32 to a suitable recorder 33, which is driven by the shaft 23 in accordance with depth of the downhole investigating apparatus 15.

Located a clockwise interval $d_1$ from write-in contact 30a is a read-out contact 30c which supplies the read-out computed signal $C_{n-d_1}$ to the normally closed contact of switch 34a. The common contact thereof is supplied to the input of a weighting function circuit 25d having a weight of $$-\frac{B}{A}$$

of weighted adding network 25. Weighting function circuit 25d comprises a suitable amplifier 35 and resistor 36 in the same manner as weighting function circuit 25a. The resistors 27 and 36 of weighted adding network 25 have a suitably high resistance compared to resistor 28 so that the current through resistors 27 and 36, which currents are proportional to the respective weighted input signals, will sum across resistor 28 to produce a voltage output which is proportional to the sum of the weighted input signals. Thus, the output signal $C_n$ from weighted adding network 25 is equal to:

$$C_n = \frac{1}{A} S_n - \frac{B}{A} C_{n-d_1} \qquad (1)$$

For present purposes, the memories can be considered to be capacitor memories, and thus the write-in amplifiers should desirably have low output impedances for quick charge and discharge of the capacitors and the read-out amplifiers should desirably have high input impedances so as to preserve the charge on each capacitor for later read-out. Thus, in FIGURE 1, amplifiers 31 and 35 should have high input impedances and amplifiers 19 and 29 low output impedances.

The derived signal $S_n$ from amplifier 19 is also supplied through a suitable single-throw switch 37 to an AC coupled RMS circuit or differentiator 38 which provides an output signal proportional to the activity level of the derived signal $S_n$. That is, if the amplitude of $S_n$ is relatively constant, the output signal from circuit 38 will be relatively low and if the derived signal $S_n$ is varying in a relatively rapid manner, the output signal from circuit 38 will be relatively high. To insure that the activity level of the derived signal $S_n$ is determined as a function of depth and not time, the shaft 23 is supplied through a suitable differentiating device 39 whose output shaft 40 rotates in accordance with the function $dt/dz$ ($z$ being displacement along the borehole axis), shaft 40 providing this function to the circuit 38. In circuit 38, this could take the form of, for example, having shaft 40 vary the timing circuit portion of circuit 38, i.e., if circuit 38 is a differentiator, shaft 40 would vary the magnitude of the capacitor or resistor therein. Thus, circuit 38 performs the function, $$\frac{dS_n}{dt} \times \frac{dt}{dz} = \frac{dS_n}{dz}$$

The output of circuit 38, in conjunction with circuit 39, is supplied to a suitable voltage sensitive trigger as, for example, a Schmitt trigger which is operative to provide an output signal upon the output voltage from circuit 38 dropping below a selected threshold value. The output from voltage sensitive trigger 41 is supplied to one input of an AND gate 42 whose output is supplied to the input of a counter 43. To provide the counting pulses for counter 43, a suitable depth pulse generating means 46 is driven from the shaft 23 to provide output pulses as a function of depth to another input of AND gate 42. Depth pulse generating means 46 could comprise for example a standard optical slotted drum mechanism, the slotted drum rotating in accordance with depth. These pulses from depth pulse generating means 46 are counted by counter 43 if there is an output signal from voltage sensitive trigger 41, and counter 43 provides an output signal after a given predetermined count. Counter 43 could comprise for example a standard binary counter with the usual logic circuits associated therewith for providing an output signal after a given count.

This output signal from counter 43 is supplied to the set input of a flip-flop 44, whose "1" output is supplied to the relay 34 for energization thereof and to one input of an AND gate 45. Also supplied to the input of AND gate 45 is the output signal from voltage sensitive trigger 41 through a suitable inverter circuit 42, and the pulses from depth pulse generating means 46. The output from AND gate 45 is supplied to a suitable counter 47, like counter 43, whose output is supplied to the reset input of flip-flop 44 and back to the reset input of counter 47. The output from voltage sensitive trigger 41 is also supplied through a suitable differentiating network 48 and back-biased diode 49 to the reset input of counter 43.

Now, concerning the operation of the FIGURE 1 apparatus, the weighted adding network 25, in write amplifier 29, memory 30 and read-out amplifier 31 comprise a computer 50 enclosed by the dash-dot line box 50 which is constructed in accordance with the teachings of the above-mentioned copending Schuster application Ser. No. 605,424. This computing circuit 50 receives the derived signal $S_n$, which corresponds to the V.G.F. $G_1$ and combines this derived signal with the read-out computed signal $C_{n-d_1}$ from read-out point 30c of memory 30 in accordance with the Equation 1 to provide a new computed signal for each depth level in the borehole.

Looking at the V.G.F. $G_1$, this computed signal $C_n$ corresponds proportionally to the V.G.F. portion $G_{c_1}$ of area A. (Because of normalization, the area of the computed V.G.F., after weighting, will be "$A+B=1$," but the vertical (borehole axis) extent thereof, will be the same as V.G.F. $G_{c_1}$.) By storing this computed signal $C_n$ for a depth interval $d_1$, it can be seen that the stored read-out computed signal $C_{n-d_1}$, now corresponding to the V.G.F. portion $G_{c_2}$ of area B after weighting, is utilized to cancel out the portion of area B of the original apparatus V.G.F. $G_1$ to leave the V.G.F. portion $G_{c_1}$, which after weighting, has an area equal to "$A+B$." This process then leaves a computer V.G.F. of much narrower vertical extent, and thus greater vertical resolution. This computer signal $C_n$ is read out through recorder 33 to provide a computed log as a function of depth of the investigated formation characteristic.

However, an error may creep into the signal processing system at some point in the borehole. This is especially likely at the bottom of the borehole at the initiation of the logging operation. To start the FIGURE 1 apparatus at the bottom of the borehole, the downhole investigating apparatus 15 remains stationary at the bottom of the borehole while supplying the derived signals to the surface of the earth. At the same time shaft 22a is cranked by hand thus causing memories 20 and 30 to rotate, and switches 32 and 37 are opened. Concerning just memory 30 for the moment, this initial operation fills all of the memory positions of memory 30 with computed signals after the memory 30 has been rotated several times. However, it can be seen that since the original apparatus V.G.F. $G_1$ is transformed into a new computed V.G.F. having one-half the vertical extent as the original apparatus V.G.F. $G_1$, this initial operation at the bottom of the borehole presumes that the earth formations are homogeneous over the entire depth interval of the original apparatus V.G.F. $G_1$. If this assumption is not true, an error will be introduced into the signal processing system and stored in memory 30 to propagate through the remainder of the computed signals which are supplied to recorder 33.

The reason why these errors will propagate through the remainder of the measurements when utilized with the particular V.G.F. $G_1$, is because the areas of the V.G.F. components $G_{c_1}$ and $G_{c_2}$ are substantially equal. Thus looking at the weights of weighted adding network 25, and remembering that for normalization $A = B = \frac{1}{2}$, the weight of weighting function circuit 25$a$ will be 2 and the weight of weighting function circuit 25$b$ will be 1. Thus, it can be seen that the read-out computed signal $C_{n-d_1}$ will be weighted by 1, thus causing any error inherent in the computed signals to propagate through the remainder of the computed signals.

To solve this problem, the apparatus of FIGURE 1 searches for relatively homogeneous formations and substitutes the signals derived from the investigating apparatus 15 when opposite these homogeneous formations for the computed signals used in the computational process to insure that the signals supplied to recorder 33 are substantially accurate.

Figure 2A:
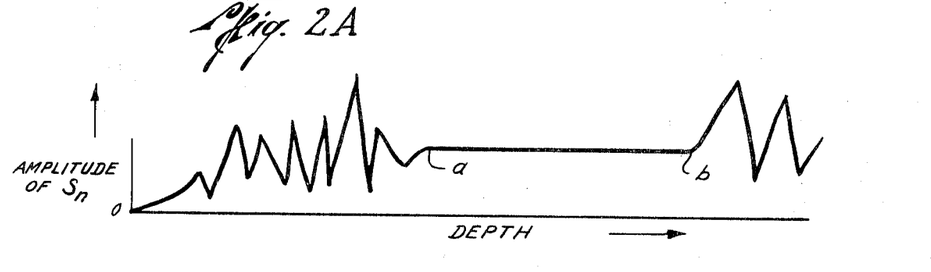
FIGURES 2a and 2b show typical logs of the signal derived from the downhole investigating apparatus for purposes of explaining features of the present invention.

Now looking at FIGURE 2$a$, there is shown a typical plot of the derived signal $S_n$ as a function of depth. It can be seen that there are regions in the earth formations where the investigated characteristic varies in a rapidly fluctuating manner. However, there is shown a region $a$–$b$ where the derived signal $S_n$ remains relatively constant in amplitude. This region $a$–$b$ is considered a relatively homogeneous region of the adjoining earth formations. It is the purpose of the FIGURE 1 apparatus to search for these relatively homogeneous formations, and while the investigating apparatus is opposite these relatively homogeneous formations, to substitute the derived signals from these homogeneous formations, for the computed signals $C_n$. This is brought about because, when the investigating apparatus 15 is opposite the relatively homogeneous formations $a$–$b$, it is known thta the derived signals over this interval $a$–$b$ tend to be substantially accurate. This is because the entire response (or V.G.F.) is derived from the one homogeneous formation.

Now referring back to FIGURE 1, there is shown a plot of the derived signal $S_n$ versus depth (shown to the right of the V.G.F.'s $G_1$ and $G_1'$). It can be seen that the derived signal $S_n$ is changing in magnitude as a function of depth as the investigating apparatus 15 transgresses the junction between the nonhomogeneous formations and homogeneous formations shown in FIGURE 1. At the point $a$, the derived signal $S_n$ tends to have a relatively constant amplitude until the investigating apparatus reaches the depth level corresponding to the point $b$ at which time, the amplitude of $S_n$ begins to vary with depth. It is this interval $a$ to $b$, corresponding to the interval $a$ to $b$ in FIGURE 2$a$, during which the FIGURE 1 apparatus causes the computed signals to be replaced with derived signals having known correct values.

The AC-RMS circuit or differentiator 38 and voltage sensitive trigger 41 monitor the derived signal $S_n$ so as to initiate the reset operation when the investigating apparatus 15 is in these homogeneous formations. When the measurement recording point "0" of investigating apparatus 15 is at the depth level $a$ in FIGURE 1, the output value of circuit 38 will go to zero, thus causing voltage sensitive trigger 41 to initiate the operation of counter 43 by allowing the pulses from depth pulse generating means 46 to pass through AND gate 42 to counter 43. After the downhole investigating apparatus has transgressed a depth interval $d_1$, counter 43 provides an output pulse to flip-flop 44 which energizes relay 34, causing the read-out derived signal $S_{n-d_1}$ from read-out point 20$b$ to be supplied to weighting function circuit 25$b$ to be weighted by the factor $$-\frac{B}{A}$$

in place of the read-out computed signal $C_{n-d_1}$. The reason why the control circuit 51 delays this reset operation for an interval $d_1$ is due to the fact that the read-out computed signal $C_{n-d_1}$ corresponding to V.G.F. component $G_{c_2}$, has a recording point which is an interval $d_1$ downhole from the recording point of the investigating apparatus 15, and to insure that the formation is homogeneous for the necessary depth interval. If desired, the delay by counter 43 could be set even greater to further insure that the reset values are accurate.

Thus, when the investigating apparatus 15 is at the depth level $a$ corresponding to the V.G.F. $G_1$ in FIGURE 1, counter 43 begins counting the pulses from depth pulse generating means 46 and when the investigating apparatus 15 is at the depth level corresponding to the V.G.F. $G_1$, it can be seen that the derived signals $S_{n-d_1}$ an interval $d_1$ earlier (or downhole) are at the same depth level as the recording depth point of the read-out computed signal $C_{n-d_1}$, and thus these derived signals $S_{n-d_1}$ are substituted for the computed signals $C_{n-d_1}$. It can be seen that the entire V.G.F. of the downhole investigating apparatus 15 is located within a homogeneous formation during this substitution process, thus insuring accuracy of the read-out derived signals $S_{n-d_1}$. Looking at computer circuit 50, it can be seen that when the switch 34$a$ is in the normally open position, derived signals $S_n$ and $S_{n-d_1}$ are being weighted by weighted adding network 25 and supplied to memory 30. This causes the reset of the computed values stored in memory 30 because of the substitution of the read-out derived signals $S_{n-d_1}$ for the read-out computed signals $C_{n-d_1}$.

It is to be understood that the signal substituted for the read-out computed signal $C_{n-d_1}$ does not necessarily have to be the signal derived an interval $d_1$ earlier (i.e. $S_{n-d_1}$) but could comprise any signal derived up to an interval $d_1$ earlier (i.e., any signal between $S_n$ and $S_{n-d_1}$). Thus, read-out contact 20$b$ of memory 20 could be an interval anywhere between "0" and $d_1$ from write-in contact 20$a$. Obviously, if it is "0," the derived signal $S_n$ would be supplied directly to switch 34$a$. Perhaps, $d_1/2$ would be the most ideal situation, since in that case, the V.G.F. $G_1'$ of FIGURE 1 would be centered with respect to the V.G.F. component $G_{c_2}$ corresponding to the read-out computed signal $C_{n-d_1}$.

This substitution or reset operation continues as long as the investigating apparatus 15 is opposite a homogeneous formation, which is determined by the circuits 38 and 41. Now, when the investigating apparatus 15 is at the depth level $b$ in the FIGURE 1 plot of $S_n$ versus depth, the amplitude of the derived signal begins changing rapidly with depth. This causes the output signal from circuit 38 to increase in amplitude, thus causing the output voltage from voltage sensitive trigger 41 to drop to zero volt. This causes AND gate 42 to become nonconductive, counter 43 is reset by the negative going pulse output from differentiator 48 through diode 49, and AND gate 45 begins supplying the depth pulses from depth pulse generating means 46 to counter 47 since the output of inverter 42$a$ and flip-flop 44 are both "one." At this time, counter 47 begins counting for a depth interval $d_1$, at which time it resets flip-flop 44 which causes relay 34 to connect the read-out contact 30$c$ of memory 30 to weighting function circuit 25$b$. This delay caused by counter 47 enables the reset operation to continue even after the investigating apparatus has left the homogeneous formation. The reason for this is, again, that the read-out derived signal $S_{n-d_1}$ was derived an interval $d_1$ earlier when the investigating apparatus 15 was still opposite the homogeneous formation.

Now, the computing circuit 50 continues to operate in the manner disclosed in the above-mentioned Schuster application Ser. No. 605,424 in that it supplies the read-out computed signal $C_{n-d_1}$ to weighting function circuit 25b to be combined with the newly derived signals $S_n$. When the control circuit 51 determines that the downhole investigating apparatus 15 is opposite another homogeneous formation, the same reset or substitution operation begins again. This operation is repeated over and over again as the investigating apparatus 15 transgresses homogeneous formations. In the event that a homogeneous formation does not have a sufficient depth interval to enable the reset or substitution operation to take place, the output voltage from voltage sensitive trigger 41 will drop to zero, thus causing counter 43 to reset before the reset or substitution operation can take place.

Figure 2B:
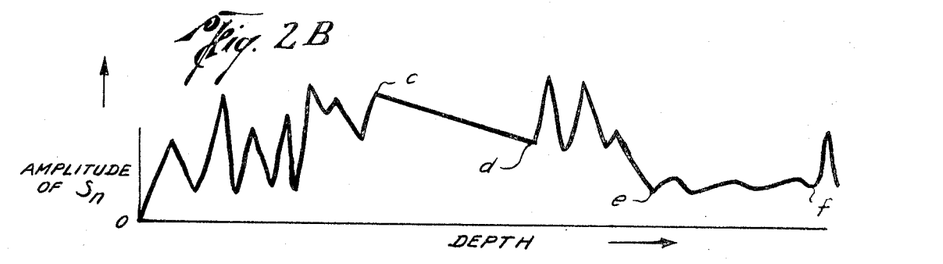

It would be desirable in connection with the present invention to allow the reset or substitution operation to allow the reset or substitution operation to take place when the investigated formations opposite the downhole investigating apparatus 15 are not entirely homogeneous, but nearly so, that is, when the formation characteristic is varying versus depth in a relatively slow manner. Looking now at FIGURE 2b, there is shown another typical plot of amplitude versus depth of the derived signal $S_n$. In the FIGURE 2b plot, along with the formation depth intervals where the derived signal $S_n$ varies in a relatively fast manner, there are shown two depth intervals c–d and e–f wherein the amplitude of $S_n$ versus depth is varying but in a relatively slow manner. It would be desirable during these depth intervals like c–d and e–f to proceed with the reset or substitution process.

Figure 3:
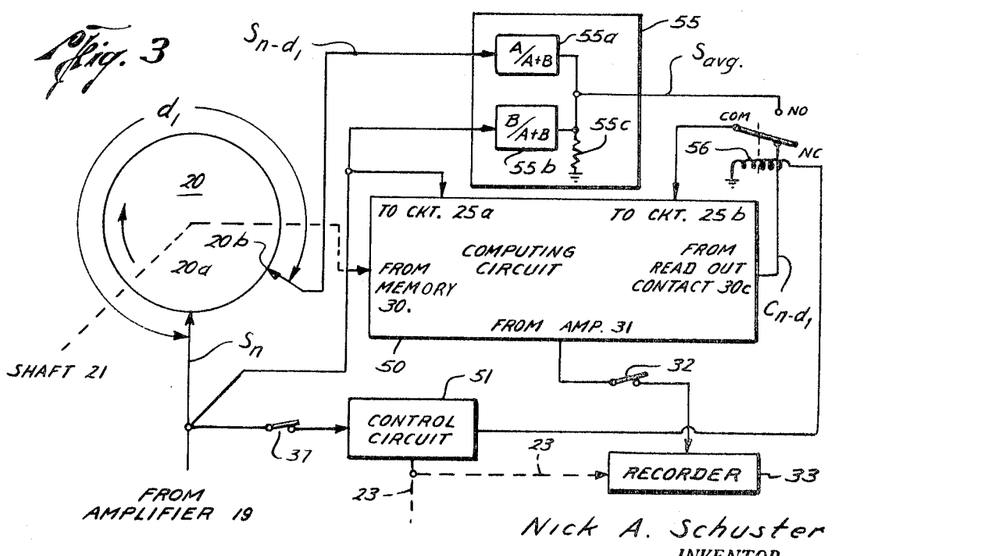
FIGURE 3 shows another embodiment of signal processing apparatus in accordance with the present invention.

Looking now at FIGURE 3, there is shown apparatus for performing the reset or substitution operation during these depth intervals where $S_n$ varies to some degree as a function of depth. In FIGURE 3, the derived signal $S_n$ from amplifier 19 is supplied to the memory 20 in the same manner as in FIGURE 1 and the read-out derived signal $S_{n-d_1}$ is read out of memory 20 the depth interval $d_1$ later and supplied to a weighting function circuit 55a, having a weight of $A/A+B$, of weighted adding network 55. The derived signal $S_n$ on the other hand, is supplied to a weighting function circuit 55b having a weight of $B/A+B$, of weighted adding network 55. The weighting function circuits 55a and 55b can be constructed in the same manner as the weighting function circuits 25a and 25b of FIGURE 1.

The output signal $S_{avg}$ from weighted adding network 55 taken across a low value resistor 55c is supplied to the normally open contact of a switch 56a driven by a relay 56, the common contact thereof being supplied to the weighting function circuit 25a within the computing circuit 50 of FIGURE 1. The read-out computed signal $C_{n-d_1}$ from read-out contact 30c within computing circuit 50 is supplied to the normally closed contact of switch 56a. The derived signal $S_n$ is also supplied to the weighting function circuit 25b within computing circuit 50 and through the single-throw switch 37 to control circuit 51 which is similar to the control circuit 51 of FIGURE 1. As in FIGURE 1, the memory 30 within computing circuit 50 is driven by the shaft 21 and the output from read-out amplifier 31 is supplied through the single-throw switch 32 to the recorder 33, which is driven by the shaft 23.

Figure 4A:
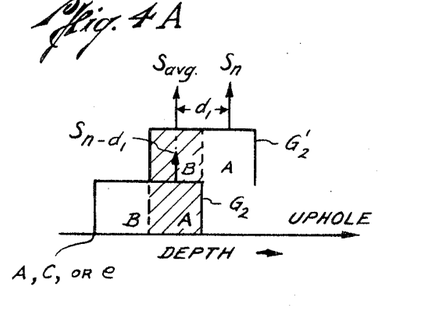
FIGURES 4a and 4b show various V.G.F.'s which are useful in explaining the operation of the FIGURE 3 apparatus.

Turning now to FIGURE 4a, there is shown the V.G.F. of a downhole investigating apparatus at two depth positions in the borehole, the V.G.F. $G_2'$ being positioned above the V.G.F. $G_2$ for clarity. The V.G.F.'s $G_2$ and $G_2'$ are shown in rectangular shape for simplicity. The arrow designated $S_n$ represents the recording point for the V.G.F. $G_2$, $S_{n-d_1}$ being the signal designation for the V.G.F. $G_2$. The arrow designated $S_n$ represents the recording point for V.G.F. $G_2'$, $S_n$ being the signal designation for V.G.F. $G_2'$. The arrows $S_n$ and $S_{n-d_1}$ are a depth interval $d_1$ apart. Both of the V.G.F.'s $G_2$ and $G_2'$ are made up of portions having areas A and B.

The portion of V.G.F. $G_2$ of area A and the portion of V.G.F. $G_2'$ of area B overlap in FIGURE 4a. By combining the two signals $S_n$ and $S_{n-d_1}$ corresponding to these two V.G.F.'s and providing the V.G.F. $G_2$ with a weight of $A/A+B$, and the signal $S_{n-d_1}$ corresponding to the V.G.F. $G_2'$ a weight of $B/A+B$, it can be seen that an average value will be obtained for the depth interval represented by the hatched line portion wherein both of these V.G.F.'s $G_2$ and $G_2'$ are common. The resulting averaged signal is designated $S_{avg}$ and is equal to $$\frac{A}{A+B}S_{n-d_1}+\frac{B}{A+B}S_n$$

This averaged signal $S_{avg}$ is normalized to "1" since $$\frac{A}{A+B}+\frac{B}{A+B}=1$$

It can be seen that this averaged signal $S_{avg}$ provides a substantially accurate value of the investigated characteristic for the depth level indicated by the hatched line area in FIGURE 4a. When the amplitude versus depth log takes on the form as shown by the depth intervals a–b, c–d, and e–f of FIGURES 2a and 2b, this averaged value $S_{avg}$ can then be substituted for the read-out computed signal $C_{n-d_1}$ as in the FIGURE 1 apparatus.

The recording point for the read-out computed signal $C_{n-d_1}$ (not shown in FIGURE 4a) as in FIGURE 1, is at the same depth level as the read-out derived signal $S_{n-d_1}$ (i.e. they are both a depth interval $d_1$ from the recording point $S_n$), the recording point for $S_{avg}$ being at the same depth level. This reset or substitution operation with averaged values continues while the investigating apparatus 15 is opposite a homogeneous formation as in the FIGURE 1 apparatus. In effect, the V.G.F.'s $G_2$ and $G_2'$ can be considered to slide along in the uphole direction as the downhole investigating apparatus moves uphole, and memory 20 rotates.

The FIGURE 3 apparatus performs the operation depicted in FIGURE 4a in essentially the same manner as in the FIGURE 1 apparatus. That is, control circuit 51 energizes relay 56 an interval $d_1$ after the investigating apparatus 15 has entered a homogeneous formation and the averaged signal $S_{avg}$ is supplied to the computing circuit 50 in place of the read-out computed signal $C_{n-d_1}$. At the proper time (i.e., an interval $d_1$ after the downhole investigating apparatus leaves a homogeneous formation), control circuit 51 allows relay 56 to become de-energized thus allowing the read-out computed signal $C_{n-d_1}$ to be supplied to weighting function circuit 25a within computing circuit 50. It is to be understood that, while in FIGURE 4a only two V.G.F.'s were shown corresponding to two depth levels in the borehole, this memory reset operation with the averaged derived signals takes place at every investigated depth level as long as the relay switch 56a is in the normally open position.

It can be seen that, in effect, the averaging operation of the FIGURE 3 apparatus will allow the threshold value of voltage sensitive trigger 44 to be set higher than in the FIGURE 1 apparatus, thus enabling the reset or substitution process to be performed more often.

Figure 4B:
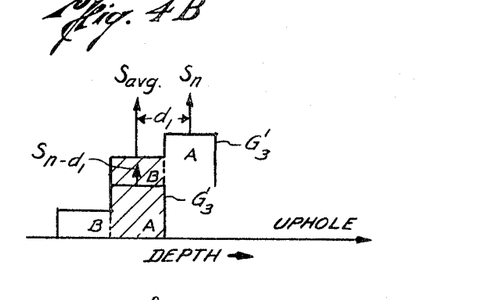

While the areas A and B of V.G.F.'s $G_2$ and $G_2'$ were shown equal, it is to be understood that this same process could be carried out with V.G.F.'s having unequal areas. Thus, looking at FIGURE 4b, there is shown a V.G.F. $G_3$ corresponding to the signal $S_{n-d_1}$ at a first position in the borehole and the same V.G.F. moved an interval $d_1$ uphole, designated $G_3'$ and corresponding to the derived signal $S_n$. It can be seen that V.G.F. $G_3$ has unequal areas A and B and that, to provide the averged signal $S_{avg}$ representing the depth interval represented by the hatched line area in FIGURE 4b, the V.G.F. $G_3$ must be weighted more heavily than V.G.F. $G_3'$. Thus looking at FIGURE 3, it can be seen that the weighting function circuit 55a to which the read-out derived signal $S_{n-d_1}$ is supplied will have a larger weight than weighting function circuit 55b to which the derived signal $S_n$ is supplied.

Figure 5:
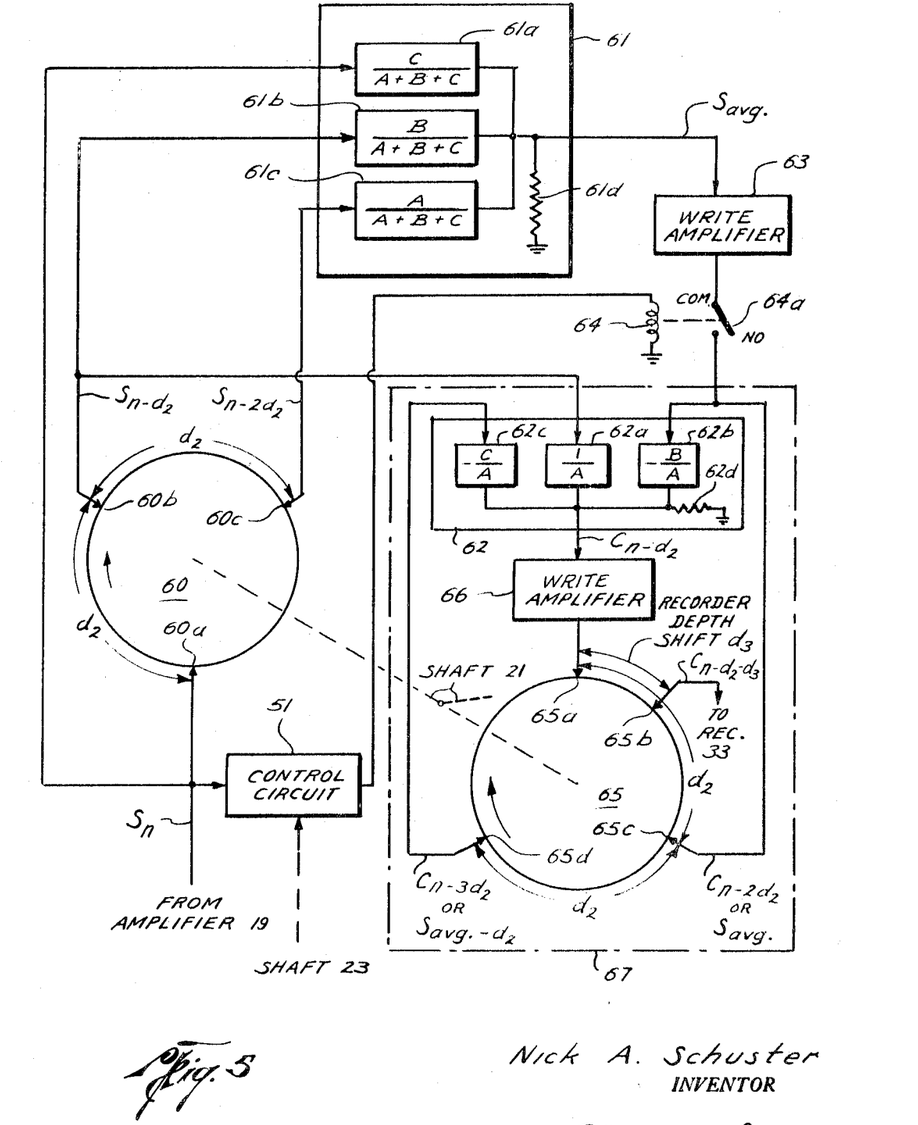
FIGURE 5 shows another embodiment of signal processing apparatus in accordance with other features of the present invention.

Referring now to FIGURE 5, there is shown apparatus for performing the reset or substitution operation of the present invention in conjunction with a signal processing system having a plurality of computing stations in accordance with the teachings of the previously mentioned copending Schuster patent application Ser. No. 605,424. In the FIGURE 5 apparatus, the derived signal $S_n$ from amplifier 19 is supplied to the write-in contact 60a of a rotating memory 60 which is driven in a clockwise direction by the shaft 21. The derived signal $S_n$ is also supplied to a weighting function circuit 61a, having a weight of $C/A+B+C$, of a weighted adding network 61. Located a clockwise interval $d_2$ from write-in contact 60a is a first read-out contact 60b which supplies the read-out derived signal $S_{n-d_2}$ to a weighting function circuit 61b having a weight of $B/A+B+C$, of weighted adding network 61, and to a weighting function circuit 62a having a weight of $1/A$, of a weighted adding network 62.

Located a clockwise interval $d_2$ from read-out contact 60b is a read-out contact 60c which supplies the read-out derived signal $S_{n-2d_2}$ to a weighting function circuit 61c having a weight of $A/A+B+C$, of weighted adding network 61. The output signal $S_{avg}$ from weighted adding network 61 is supplied to the input of a suitable write amplifier 63 whose low impedance output is supplied to the common contact of a relay operated switch 64a, the normally open contact thereof being supplied to a weighting function circuit 62b, having a weight of $$-\frac{B}{A}$$

of weighted adding network 62, and to write-in–read-out contact 65c of a suitable rotating memory 65 which is driven in a clockwise direction from shaft 21. Write-in–read-out contact 65c reads out the stored computed signal $C_{n-2d_2}$ when switch 64a is in the normally open position. The computed output signal $C_{n-d_2}$ from weighted adding network 62, taken across a suitable low value resistor 62d, is supplied through a write amplifier 66 to a write-in contact 65a of memory 65.

Located a short clockwise interval $d_3$ from read-in contact 65a is a read-out contact 65b which supplies the read-out computed signal $C_{n-d_2-3}$ through the read-out amplifier 31 and switch 32 of FIGURE 1 to the recorder 33. The total recorder depth shift is $d_2+d_3$ in the FIGURE 5 apparatus. Another read-out contact 65d which is located a clockwise interval $d_2$ from write-in–read-out contact 65c supplies the read-out computed signal $C_{n-3d_2}$ to a weighting function circuit 62c, having a weight of $$-\frac{C}{A}$$

of weighted adding network 62. The derived signal $S_n$ is also supplied to the control circuit 51 of FIGURE 1 which controls the relay solenoid 64.

Now, concerning the operation of the FIGURE 5 apparatus, the circuitry comprising the weighted adding network 62, write amplifier 66 and memory 65, designated by the dot-dash line box 67, comprises the multiple station computing circuit in accordance with the teachings of the above-mentioned Schuster application Ser. No. 605,424. (Note: The computing stations are the depth levels corresponding to the signals which are supplied to weighted adding network 62. Thus, computer 67 is a 3-station computer.)

Figure 6A:
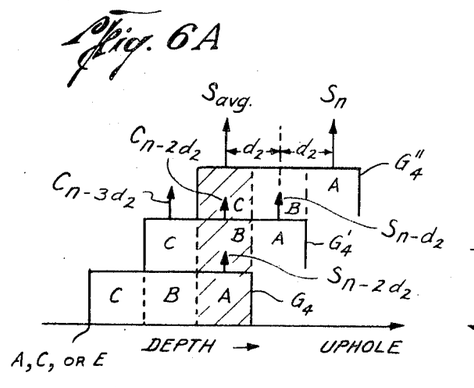
FIGURES 6a and 6b show graphical representations of V.G.F.'s useful in explaining the operation of the FIGURE 5 apparatus.

Referring to FIGURE 6, there are shown identical V.G.F.'s $G_4$, $G_4'$, $G_4''$ representing the investigating apparatus at three separate depth levels an integral $d_2$ apart, which for purposes of explanation of the FIGURE 5 apparatus, is considered to be the V.G.F. of the derived signal $S_n$. The V.G.F. $G_4$ has components of areas A, B, and C. The computed output signal $C_n$ from weighted adding network 62 in FIGURE 5 has the V.G.F. shape of the V.G.F. portion having an area A. This computed V.G.F. corresponding to the computed signal $C_n$ is stored in memory 65 and read out at suitable depth levels to cancel out the V.G.F. portions having areas B and C to leave the V.G.F. portion of area A. Looking at the signal designations $S_{n-d_2}$, $C_{n-2d_2}$, and $C_{n-3d_2}$ of V.G.F. $G_4'$, the read-out computed signals $C_{n-2d_2}$ and $C_{n-3d_2}$ are combined with the read-out derived signal $S_{n-d_2}$ to produce the computed signal $C_{n-d_2}$ whose V.G.F. has the same shape and vertical extent as the V.G.F. component area A. (The actual final computed V.G.F., though, is normalized to 1.) The particular weighting functions of weighted adding network 62 provide the necessary normalization so that the area of the computed V.G.F. corresponding to the computed signal $C_n$ is the same in magnitude as the area of the derived signal $S_n$.

Now concerning the portion of the FIGURE 5 apparatus that provides for the reset or substitution operation when the downhole investigating apparatus is opposite relatively homogeneous formations, the signals corresponding to the V.G.F.'s of FIGURE 6 are $S_n$ for $G_4''$, $S_{n-d_2}$ for $G_4'$ and $S_{n-2d_2}$ for $G_4$. Looking at FIGURE 5, it can be seen that these signals $S_n$, $S_{n-d_2}$ and $S_{n-2d_2}$ are all supplied to weighted adding network 61. These three V.G.F.'s in FIGURE 6 have a common depth interval, which is shaded in FIGURE 6. It can be seen that if these three V.G.F.'s $G_4$, $G_4'$ and $G_4''$ are combined with the proper weights, an averaged value can be obtained for the depth interval corresponding to the shaded area in FIGURE 6. It is to be noted that the derived signal supplied to computer 67 is the read-out derived signal $S_{n-d_2}$. Looking at FIGURE 6a, it can be seen that the hatched line area, corresponding to the averaged signal $S_{avg}$ is at the same depth level as the read-out computed signal $C_{n-2d_2}$. Thus, by supplying the averaged signal $S_{avg}$ to weighting function circuit 62b and write-in–read-out contact 65c, it can be seen that $S_{avg}$ has been substituted for $C_{n-2d_2}$.

One manner of determining the weights for the signals corresponding to these three V.G.F.'s, in connection with the averaged signal $S_{avg}$, is to give each signal a weight equal to the ratio of its V.G.F area which is common to this hatched line portion of FIGURE 6, to the total area $A+B+C$. Thus, the weight to be applied to the derived $S_n$ is $S/A+B+C$, the weight to be applied to the read-out derived signal $S_{n-d_2}$ is $B/A+B+C$, and the weight to be applied to the read-out derived signal $S_{n-d_2}$ is $A/A+B+C$. It may also be desirable to weigh the center V.G.F. $G_4'$ disproportionate to its area, but the sum of the weights must still equal 1 for normalization. This averaging process is done in weighted adding network 61 to produce the resulting averaged signal $S_{avg}$.

During the time when the control circuit 51 senses that the activity level of the adjoining earth formations is too high for the reset or substitution operation, the computer circuit 67 operates in the normal manner by reading the computed signal $C_{n-2d_2}$ and $C_{n-3d_2}$ out of memory 65 to be combined with the derived signal $S_{n-d_2}$ read out from memory 60, to provide the new computed signal $C_{n-d_2}$. Now, when the control circuit 51 determines that the investigating apparatus has been investigating a relatively homogeneous formation for the necessary depth interval, control circuit 51 energizes relay solenoid 64 causing the output signal $S_{avg}$ from write amplifier 63 to be supplied to the weighting function circuit 62b and to be written into memory 65 at write-in–read-out contact 65c.

When the downhole investigating apparatus has moved an interval $d_2$ uphole, this averaged reading which is written into contact 65c is now at read-out contact 65d and designated $S_{avg-d_2}$. At this time, all of the signals applied to weighted adding network 62 will be values obtained while the investigating apparatus was opposite the homogeneous formation. That is, the signal applied to weighting function circuit 62a will be the read-out derived signal $S_{n-d_2}$, the signal applied to weighting function circuit 62b will be the averaged signal $S_{avg}$ from weighted adding network 61, and the signal applied to weighting function circuit 62c will be the read-out averaged signal $S_{avg-d_2}$. Thus, it can be seen that an interval $2d_2$ after relay 64 is energized, all of the values in memory 65 will have been corrected.

It is to be understood that any V.G.F. could be utilized with the present invention beside the ones specifically shown herein, and furthermore it is not necessary that the intervals between read-out points from the memory storing the derived signals be the same as the intervals between read-out points of the computer memory. Looking at FIGURE 6b, there is shown a V.G.F. $G_5$ whose signal is designated $S_{n-2d_4}$, and having portions whose areas are A, B, and C. The V.G.F. $G_5'$ represents the investigating apparatus moved a depth interval $d_4$ uphole and whose signal designation is $S_{n-d_4}$ and the V.G.F. $G_5''$ represents the investigating apparatus moved uphole another interval $d_4$, whose signal designation is $S_n$. Looking at the V.G.F. $G_5''$, it is broken down into component V.G.F.'s $G_{c_3}$, $G_{c_4}$, $G_{c_5}$ and $G_{c_6}$. In accordance with the teachings of the previously mentioned Schuster application Ser. No. 605,424, the component V.G.F.'s $G_{c_4}$, $G_{c_5}$ and $G_{c_6}$ cancel out portions of the original apparatus V.G.F. $G_5''$ to leave the V.G.F. $G_{c_3}$ as the final computed V.G.F. The depth interval (base) of each of these component V.G.F.'s is $d_4$.

Figure 6B:
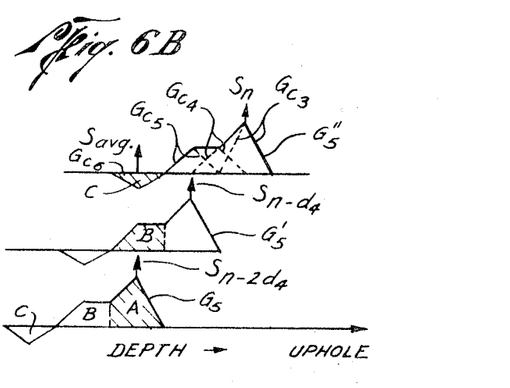

Since the averaged signal $S_{avg}$ should correspond to the same vertical interval as the final computed V.G.F., the interval between the write-in and read-out points of the derived signal memory should be $d_4$. In accordance with the previous teachings, the V.G.F. $G_5$ corresponding to the read-out derived signal $S_{n-2d_4}$ would be $A/A+B-C$ the weight to be applied to the read-out derived signal $S_{n-d_4}$ would be $B/A+B-C$ and the weight to be applied to the derived signal $S_n$ would be $-C/A+B-C$. (Or, disproportionate weights could be utilized.) The resulting averaged signal $S_{avg}$ would correspond to the average value of the investigated characteristic at the depth level corresponding to the recording point of V.G.F. $G_5$. As before, the weighting functions for each of the three signals are made to equal 1 for normalization.

Figure 7:
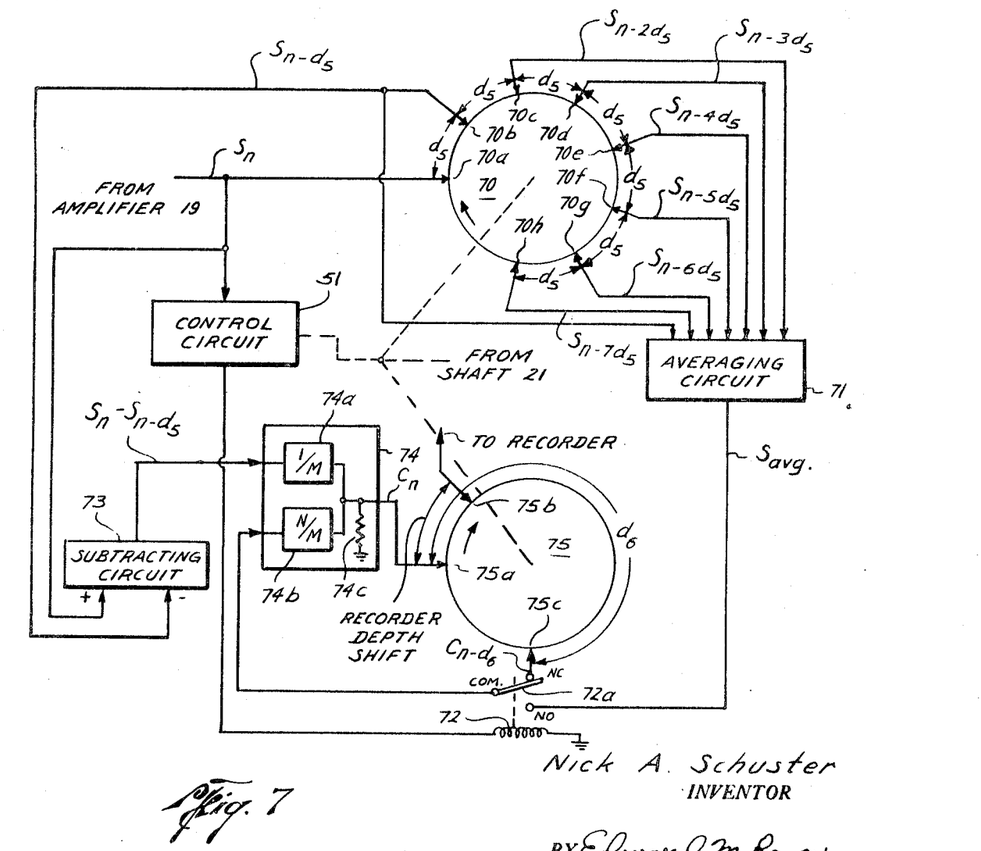
FIGURE 7 shows another embodiment of signal processing apparatus in accordance with other features of the present invention.

Looking now at FIGURE 7, there is shown the signal processing apparatus disclosed in the copending Schuster application Ser. No. 643,560 in combination with the reset or substitution operation of the present invention. In FIGURE 7, the derived signal $S_n$ from amplifier 19 is supplied to a write-in point 70a of a suitable rotating memory 70 which is rotated in a clockwise direction from shaft 21 as in the FIGURE 1 apparatus. Located a clockwise interval $d_5$ is a first read-out point 70b and located at intervals $d_5$ apart in a clockwise direction from read-out point 70b are a plurality of read-out points 70c, 70d, 70e, 70f, 70g and 70h which supply the read-out derived signals $S_{n-d_5}$, $S_{n-2d_5}$, $S_{n-3d_5}$, $S_{n-4d_5}$, $S_{n-5d_5}$, $S_{n-6d_5}$, and $S_{n-d7_5}$ respectively to an averaging (weighted adding) circuit 71 constructed in accordance with the previously mentioned techniques in connection with weighted adding networks 55 and 61 of FIGURES 3 and 5. The averaged output signal $S_{avg}$ from averaging circuit 71 is supplied to the normally open contact of a switch 72a controlled by a relay solenoid 72 from control circuit 51 in the same manner as FIGURE 1.

The derived signal $S_n$ is also supplied to the positive input of a subtracting circuit 73 which could suitably be a differential amplifier. The minus input to subtracting circuit 73 is supplied from read-out contact 70b which supplies the read-out derived signal $S_{n-d_5}$. The difference signal $S_n - S_{n-d_5}$ from subtracting circuit 73 is supplied to a weighting function circuit 74a having a weight of $1/M$, of a weighted adding network 74. The computed output signal $C_n$ of weighted adding network 74, taken across a low value resistor 74c, is supplied to a write-in contact 75a of a rotating memory 75 driven in a clockwise direction by shaft 21. Located a short clockwise interval from write-in contact 75a is a read-out contact 75b which supplies the read-out computed signal $C_n$ to the recorder. Located a clockwise interval $d_6$ from write-in contact 75a is a read-out contact 75c which supplies the read-out computed signals $C_{n-d_6}$ through the normally closed contact of switch 72a to a weighting function circuit 74b having a weight of $N/M$.

Now concerning the operation of the FIGURE 7 apparatus, the circuitry comprising subtracting circuit 73, weighted adding network 74 and memory 75 comprises one embodiment of the signal processing apparatus disclosed in copending Schuster application Ser. No. 643,560. Looking at FIGURE 8, this computing circuitry converts the original apparatus V.G.F. $G_7$ to the computed V.G.F. represented by the V.G.F. portion of area "M." (Shown above V.G.F. $G_7$.) This is accomplished by subtracting a signal derived a depth interval $d_5$ prior to the depth at which the presently derived signal $S_n$ is derived, from the derived signal $S_n$, and utilizing a computed signal stored in memory to cancel out undesired portions of the resulting difference V.G.F.

Figure 8:
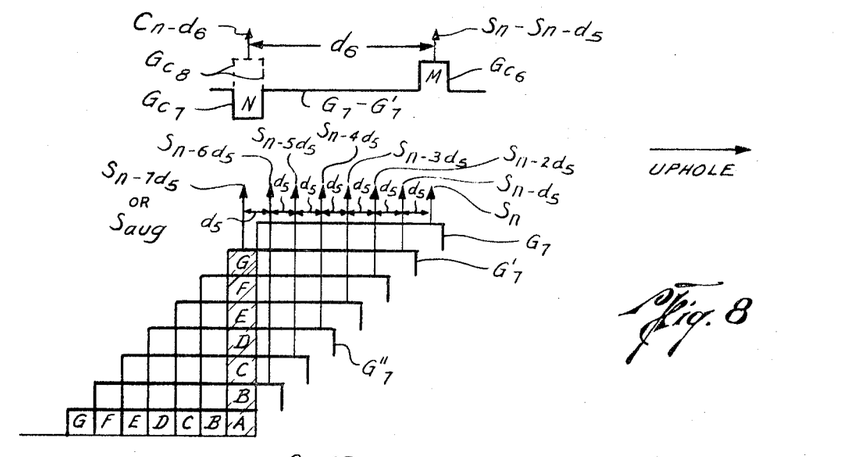
FIGURE 8 shows graphical representations of V.G.F.'s useful in explaining the operation of the FIGURE 9 apparatus.

There is also shown in FIGURE 8 the original apparatus V.G.F. $G_7$ located at a plurality of depth levels $d_5$ apart in the borehole. The V.G.F. $G_7'$ corresponding to the signal derived a depth interval $d_5$ earlier (downhole), i.e., $S_{n-d_5}$, is subtracted from the V.G.F. $G_7$, corresponding to the derived signal $S_n$, to leave the difference V.G.F. $G_7 - G_7'$, corresponding to $S_n - S_{n-d_5}$. This difference V.G.F. $G_7 - G_7'$ (solid line curve) has two V.G.F. component $G_{c_6}$ and $G_{c_7}$ having the same shape and having areas M and N respectively. By cancelling out the trailing V.G.F. component $G_{c_7}$ with the dotted line V.G.F. component $G_{c_8}$, the leading V.G.F. component $G_{c_6}$ remains as the computed V.G.F. It can be seen that the "added in" V.G.F. component $G_{c_8}$ represents a computed signal obtained at an earlier depth which was stored, and read out a depth interval $d_6$ later.

Referring to FIGURE 7 to see how this operation is performed, the derived signal $S_n$ and the read-out derived signal $S_{n-d_5}$ are supplied to the subtracting circuit 73 which supplies the resulting difference signal $S_n - S_{n-d_5}$ to the weighted adding network 74 to which also is supplied the read-out computed signals $C_{n-d_6}$. The weighting functions $1/M$ and $N/M$ of the weighted adding network 74 are obtained in accordance with the teachings of the above-mentioned Schuster copending application Ser. No. 643,560.

Now concerning the reset or substitution operation in combination with the FIGURE 7 computing circuitry, the derived signals $S_n$ from amplifier 19 are stored in the memory 70 and read out at intervals of $d_5$ apart to be averaged by averaging circuit 71. Looking now at FIGURE 8, there is shown the plurality of V.G.F.'s corresponding to each of these signals averaged by averaging circuit 71. The hatched line portion of the V.G.F.'s corresponding to the stored derived signals $S_{n-d_5}$ through $S_{n-7d_5}$, in FIGURE 8 represents the same depth interval as the component V.G.F. $G_{c_8}$ corresponding to the stored computed signal $C_{n-d_6}$.

By averaging the signals $S_{n-d_5}$ through $S_{n-7d_5}$, an averaged signal $S_{avg}$ can be derived from all of the stored derived signals which have any information about this depth interval corresponding to the hatched line areas in FIGURE 8. Desirably, the weights to be applied to the various stored derived signals $S_{n-d_5}$ through $S_{n-7d_5}$ should be disproportionate to the areas of each V.G.F. which are common to this hatched line depth interval in FIGURE 8. That is to say, the stored derived signal $S_{n-4d_5}$ corresponding to V.G.F. $G_7''$ should have the greatest weight with the stored derived signals on either side of $S_{n-4d_5}$ having lesser weights the further removed they are from this central stored derived signal $S_{n-4d_5}$. However, the weighting functions should be such that the total V.G.F. area of the averaged signal $S_{avg}$ is normalized to "1" as in the preceding embodiments.

Referring back to FIGURE 7, the control circuit 51 operates in the same manner as in the preceding embodiments, causing the averaged signal $S_{avg}$ to be supplied to weighted adding network 74 in place of the read-out compuated signal $C_{n-d_6}$ upon the control circuit 51 determining that a relatively homogeneous formation has been transgressed for the necessary depth interval. When the investigating apparatus enters formations which are not of the necessary homogeneity, control circuit 51 de-energizes relay solenoid 72 thus causing the computed signals $C_{n-d_6}$ to be supplied to the weighted adding network 74.

Looking at FIGURE 8 to determine the depth intervals which the counters within control circuit 51 should be set to, counter 43 should be set to $7d_5$ since this is the interval required for all of the V.G.F.'s corresponding to the averaged signals to be opposite the relatively homogeneous formation. The depth interval to which counter 47 should be set is $d_5$ since the last V.G.F. $G_7'$ used in the averaging process is a depth interval $d_5$ behind the recording point of the presently derived signal $S_n$. Of course, if desired, not all of the stored derived signals shown in FIGURE 8 need be utilized to arrive at the averaged signal $S_{avg}$, thus decreasing the count of counter 43 and increasing the count of counter 47. This would make the depth interval over which the reset or substitution process is performed even greater.

Figure 9:
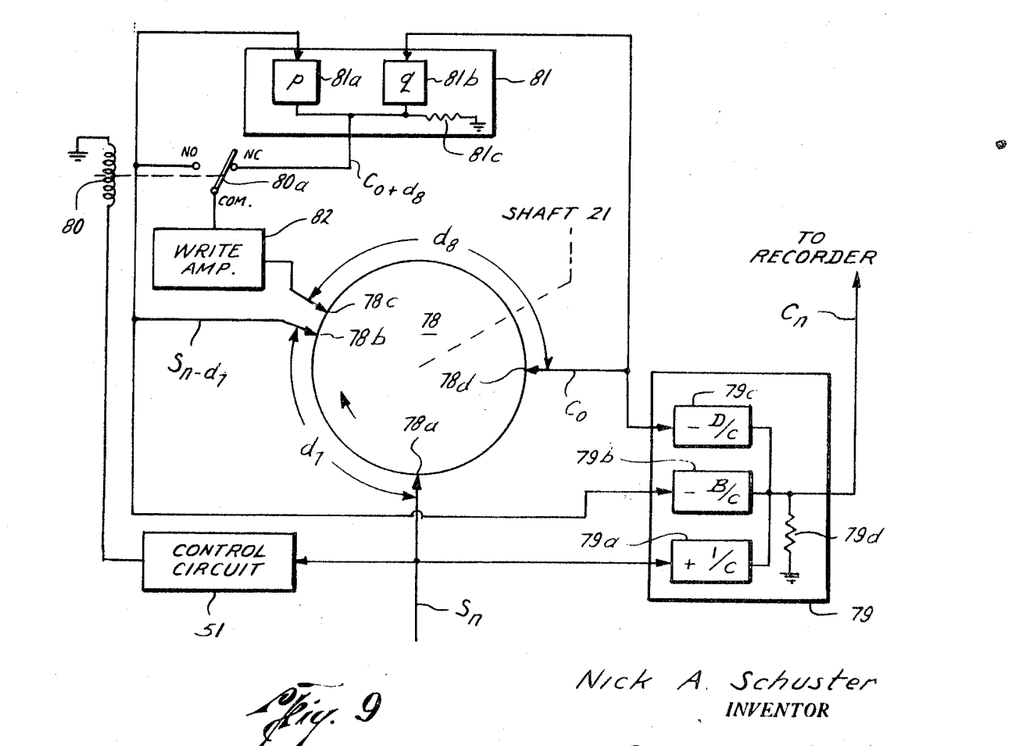
FIGURE 9 shows still another embodiment of signal processing apparatus in accordance with the present invention.

Looking now at FIGURE 9, there is shown signal processing apparatus constructed in accordance with the teachings of the above-mentioned copending Tanguy application Ser. No. 643,581 in combination with the reset or substitution operation of the present invention. In the FIGURE 9 apparatus, the derived signal $S_n$ is supplied to a suitable write-in point 78a of a memory 78, to the control circuit 51, and to a weighting function circuit 79a having a weight of $1/C$, of a weighted adding network 79. The memory 78 is driven in a clockwise direction from the shaft 21. Located a clockwise interval $d_7$ from write-in point 78a is a read-out point 78b which supplies the read-out derived signal $S_{n-d_7}$ to a weighting function circuit 79b having a weight of $$-\frac{B}{C}$$

of weighted adding network 79. The read-out signal $S_{n-d_7}$ is also supplied to a normally open contact of a switch 80a controlled by a relay solenoid 80 energized by control circuit 51, and a weighting function circuit 81a having a weight of "$p$," of a weighted adding network 81. The output signal $C_{c+d_8}$ from weighted adding network 81, taken across a suitable low value resistor 81c is supplied through the normally closed and common contacts of switch 80a and through a write-in amplifier 82 to a write contact 78c of memory 78. Located a clockwise interval $d_8$ from write-in contact 78c is another read-out contact 78d which supplies the read-out infinite series computed signal $C_0$ to a weighting function circuit 79c having a weight of $$-\frac{D}{C}$$

of weighted adding network 79, and to a weighting function circuit 81b having a weight of "$q$," of weighted adding network 81. The computed output signal $C_n$ from weighted adding network 79, taken across a low value resistor 79d is supplied to a suitable recorder.

Figure 10A:
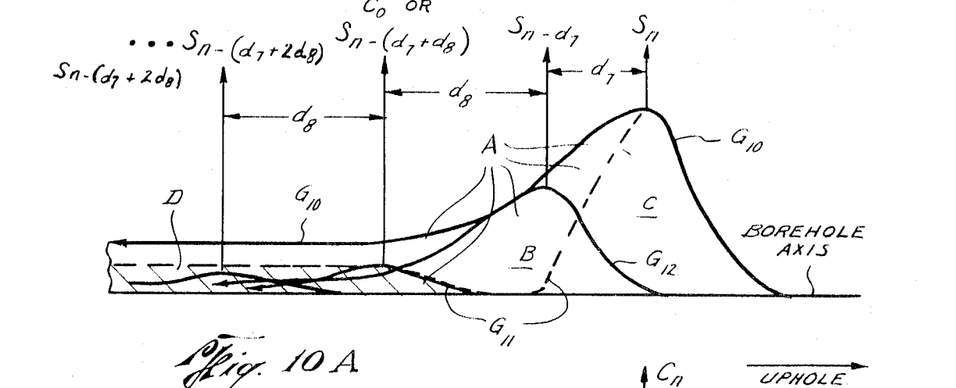
FIGURES 10a and 10b show graphical representations of V.G.F.'s useful in explaining the operation of the FIGURE 9 apparatus.
Figure 10B:
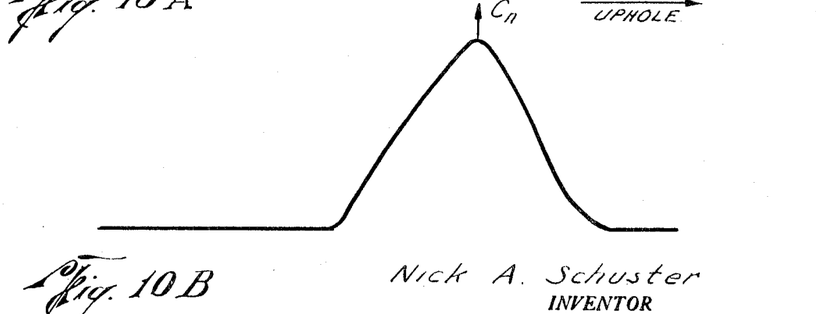

The circuitry of FIGURE 9 comprising weighted adding networks 79 and 81, write amplifier 82 and memory 78 comprise the signal processing system of the above-mentioned Tanguy application. Looking now at FIGURES 10a and 10b, the solid line V.G.F. $G_{10}$ of FIGURE 10a is the original apparatus V.G.F. of area A corresponding to the derived signal $S_n$. The V.G.F. $G_{12}$ of area B corresponding to the derived stored signal $S_{n-d_7}$, after weighting, is subtracted from V.G.F. $G_{10}$ to leave the dotted line V.G.F. $G_{11}$. The hatched line portion of this V.G.F. $G_{11}$ of area D is subtracted out by the infinite series computed signal $C_0$. This infinite series computed signal is generated by the combination of the read-out infinite series computed signal $C_0$ from read-out point 78d in FIGURE 9 with the read-out derived signal $S_{n-d_7}$ in weighted adding network 81. By combining this infinite series computed signal $C_0$ and the readout derived signal $S_{n-d_7}$ with the newly derived signal $S_n$ in weighted adding network 79 in accordance with the teachings of the Tanguy application, a computed signal having the V.G.F. of FIGURE 10b is supplied to the recorder.

This infinite series computed signal $C_0$ corresponding to the hatched line area D in FIGURE 10a is made up of a series of weighted V.G.F.'s.

$$C_0 = pS_{n-d_7} + pqS_{n-(d_7+d_8)} + pq^2S_{n-(d_7+2d_8)} + \ldots + pq^mS_{n-(d_7+md_8)} \quad (2)$$

where, $$p\left(1+\sum_1^\infty q^m\right)=1 \text{ for normalization} \quad (3)$$

In FIGURE 10a, only the V.G.F.'s corresponding to $S_{n-(d_7+d_8)}$ and $S_{n-(d_7+2d_8)}$ are shown. It can be seen from Equation 2 that if "$q$" is relatively small, any error which enters the signal processing system will be quickly eliminated. However, it may be desirable to utilize a signal processing system designed in accordance with the teachings of the copending Tanguy application wherein the value of "$q$" is relatively large. In V.G.F. terms, this would take on the form as shown by the hatched line area in FIGURE 10a wherein this hatched line area does not approach zero very rapidly. In this event, it can be seen that any error induced into the Tanguy signal processing system would not propagate to zero for a relatively long depth interval.

Referring to FIGURE 9, the control circuit 51 causes the relay switch 80a to switch to the normally open position thus supplying the read-out derived signals $S_{n-d_7}$ to write in contact 78c in place of the infinite series computed signals $C_0$ upon the investigating apparatus entering a relatively homogeneous formation for the required depth interval. The depth interval for which the control circuit 51 delays before energizing relay solenoid 80 can be any desired depth interval, in this case, depending on the degree of accuracy required. Since the V.G.F. $G_{10}$ in FIGURE 10a corresponding to the derived signal $S_n$ has some response greater than zero for a considerable depth interval in the downhole direction, it may not be desirable to wait to reset the memory 78 until the entire response of the downhole investigating apparatus (i.e., the entire V.G.F. area) is within the homogeneous formation. Thus, it may be desirable to set the depth interval of counter 43 such that some large percentage (e.g., 90%) of the total V.G.F. area is within the homogeneous formation. Also in accordance with the teachings of the present invention, the derived signals could be stored and averaged to provide even better results.

The depth interval which the counter 47 (delay of reset operation after leaving homogeneous formation) of the FIGURE 1 control circuit 51 can be set to is $d_7$. Looking at FIGURE 10a, this can be seen by noting that when the V.F.G. $G_{10}$ corresponding to the derived signal $S_n$ enters a nonhomogeneous formation, the stored derived signals read out of memory 78 at read-out contact 78b were derived when the investigating apparatus was located opposite a homogeneous formation. Thus the reset operation can continue for this depth interval $d_7$ after the investigating apparatus has left the relatively homogeneous formation.

Figure 11:
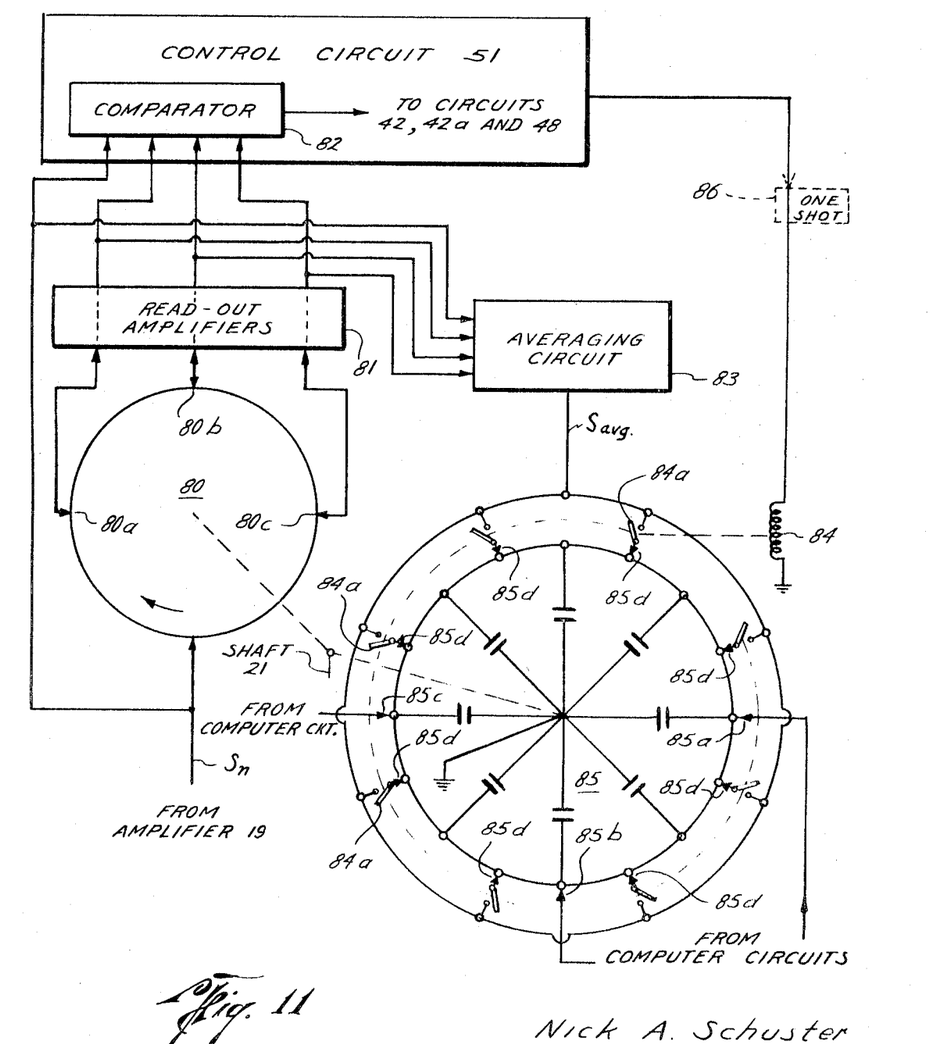
FIGURE 11 shows another embodiment of the present invention.

Referring now to FIGURE 11, there is shown another embodiment of reset apparatus that could be utilized with any of the preceding embodiments. In FIGURE 11, a memory 80 stores the derived signal $S_n$ from amplifier 19 and read the stored derived signals out at suitable readout points 80a, 80b and 80c to be supplied through suitable read-out amplifiers, along with the derived signal $S_n$, to a suitable comparator 82 of control circuit 51 and an averaging circuit 83. The comparator 82 takes the place of circuits 38 and 41 in FIGURE 1. Comparator 82 supplies an output signal to the remaining circuitry within control circuit 51 upon all of the applied input signals to comparator 82 having approximately the same value. Then, after the necessary delay, control circuit 51 energizes a suitable relay solenoid 84, which closes a plurality of normally open relay contacts 84a, allowing the averaged signal output $S_{avg.}$ from averaging circuit 83 to be used for reset purposes.

The memory 85 represents the computer memory in which the computed signals are stored, the remainder of the computer circuitry (like computers 50 and 67) not being shown. Memory 85 is a rotating capacitor memory, having a plurality of capacitors 85a, one end being grounded and the other end open circuited. The write-in or read-out contacts to the computer circuits are designated 85a, 85b and 85c. Located at equal intervals apart are a plurality of write-in contacts 85d spaced apart from the write-in or read-out contacts to the computer. All of these contacts 85d are tied to the normally open relay contacts 84a which are connected to the output of averaging circuit 83.

In operation, comparator 82 searches for homogeneous formations, and after the investigating apparatus has been investigating such a homogeneous formation for the necessary depth interval every capacitor is reset with the averaged $S_{avg.}$ from averaging circuit 83. By placing a monostable multivibrator (one-shot) 86, shown as a dotted line box, the reset of memory 85 would take place only once. But, if desired, one-shot 86 could be omitted, thus enabling the memory reset to occur as long as control circuit 51 allows.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for processing well logging signals, comprising:
   (a) means for deriving signals representative of a characteristic of earth formations surrounding a borehole at different depth levels throughout the borehole, each derived signal being representative of the characteristic in a given formation portion;
   (b) means for combining each derived signal with at least one other signal to provide computed signals which are correlated in depth with the derived signals;
   (c) memory means for storing the computed signals;
   (d) means for reading out the computed signals from the memory means at later times and supplying at least one of the computed signals to the combining means to be combined with each derived signal, said at least one read-out computed signal operating to cancel a selected formation response portion of each derived signal; and
   (e) means responsive to the rate of change of the derived signals as a function of depth for correcting at least one of the computed signals so as to provide more accurate representations of the characteristic of the surrounding earth formations.

2. The apparatus of claim 1 wherein the means for correcting at least one of the computed signals includes:
   (1) control means responsive to the derived signals for determining the relative homogeneity of the surrounding earth formations; and
   (2) means coupled to the control means for correcting selected computed signals.

3. The apparatus of claim 2 wherein the means coupled to the control means includes:
   (1) means for storing the derived signals; and
   (2) means coupled to the control means for substituting selected stored derived signals for selected read-out computed signals which are combined with each derived signal.

4. The apparatus of claim 2 wherein the means coupled to the control means includes:
   (1) means for storing the derived signals;
   (2) means for averaging selected derived signals, at least some of which are stored derived signals, to provide an averaged signal representative of the formation characteristic at selected depth levels; and
   (3) means coupled to the control means for substituting selected averaged signals for selected read-out computed signals corresponding to the same depth level.

5. The apparatus of claim 2 wherein the control means includes:
   (1) means for determining the activity level of the derived signals and generating a constant output signal upon the activity level attaining a desired value; and
   (2) means responsive to the output signal for enabling the correction of said computed signals upon the constant output signal being generated for a given depth interval.

6. The apparatus of claim 5 wherein the means for correcting selected computed signals comprises means responsive to the generated constant output signal for resetting substantially every computed signal stored in memory at one time.

7. The apparatus of claim 5 wherein the means responsive to the output signal for enabling the correction includes means responsive to thte generated output signal for enabling the correction of said computed signals for a given depth interval after the discontinuation of the output signal.

8. The apparatus of claim 2 wherein the means coupled to the control means includes:
   (1) means for storing the derived signals; and
   (2) means coupled to the control means for substituting selected derived signals for selected computed signals.

9. The apparatus of claim 3 and further including means for substituting selected stored derived signals for selected stored computed signals.

10. The apparatus of claim 2 wherein the means coupled to the control means includes:
    (1) means for storing the derived signals;
    (2) means coupled to the control means for averaging selected stored derived signals to provide an averaged signal representative of the formation characteristic at selected depth levels; and
    (3) means for substituting each averaged signal for each stored computed signal corresponding to the same depth level.

11. The apparatus of claim 10 and further including means for substituting each averaged signal for each read-out computed signal corresponding to the same depth level.

12. The apparatus of claim 7 wherein the means coupled to the control means for correcting selected computed signals includes:
    (1) means for storing the derived signals;
    (2) means for averaging selected derived signals, at least some of which are stored derived signals, to provide an averaged signal representative of the formation characteristic at selected depth levels; and
    (3) means coupled to the control means for substituting each averaged signal for one of the stored or read-out computed signals corresponding to the same depth level.

13. The apparatus of claim 5 wherein the means for determining the activity level of the derived signals comprises one of means for differentiating the derived signals as a function of depth or means for determining the RMS value of the derived signals.

14. The apparatus of claim 5 wherein the means for determining the activity level of the derived signals comprises means for comparing the amplitude levels of a plurality of the signals derived at selected depth levels in the borehole and generating a constant output signal upon the compared derived signals having desired amplitude levels with respect to one another.

15. The apparatus of claim 1 wherein the means for combining each derived signal with at least one other signal to provide computed signals includes:
  (1) means for subtracting a signal derived at one depth level from a signal derived at another depth level to produce a difference signal; and
  (2) means for combining the difference signal with at least one of the read-out computed signals to produce each new computed signal.

16. The apparatus of claim 1 wherein the means for combining each derived signal with at least one other signal to provide computed signals includes:
  (1) first combining means for combining each derived signal with at least one other signal to produce first computed signals;
  (2) means for storing the first computed signals;
  (3) means for reading out the first computed signals at later times and supplying at least one of the read-out first computed signals to the first combining means; and
  (4) second combining means for combining each derived signal with at least a selected first computed signal to produce second computed signals, the correcting means being adapted to correct selected first computed signals.

17. A method of processing well logging signals, comprising:
  (a) deriving signals representative of a characteristic of earth formations surrounding a borehole at different depth levels throughout the borehole, each derived signal being representative of the characteristic in a given formation portion;
  (b) combining each derived signal with at least one other signal to provide computed signals which are correlated in depth with the derived signals;
  (c) storing the computed signals;
  (d) reading out the computed signals at later times and using at least one of the computed signals as the signal to be combined with each derived signal, said at least one computed signal operating to cancel out a selected formation response portion of each derived signal; and
  (e) correcting at least one of the computed signals in response to the rate of the derived signals as a function of depth so as to provide more accurate representations of the characteristic of the surrounding earth formations.

18. The method of claim 17 wherein the step of correcting at least one of the computed signals includes:
  (1) generating an output signal when the activity level of the derived signals is relatively low; and
  (2) correcting selected computed signals in response to the generated output signal.

19. The method of claim 18 wherein the step of correcting selected computed signals includes:
  (1) storing the derived signals; and
  (2) substituting selected stored derived signals for one of selected read out or stored computed signals in response to the generated output signal.

20. The method of claim 18 wherein the step of correcting selected computed signals includes:
  (1) storing the derived signals;
  (2) averaging selected stored derived signals to provide an averaged signal corresponding to the formation characteristic at one depth level; and
  (3) substituting selected averaged signals for one of the selected read out or stored computed signals corresponding to the same depth level.

21. The method of claim 17 wherein the step of correcting at least one of the computed signals includes:
  (1) sampling selected ones of the derived signals and generating an output signal when said sampled derived signals have a predetermined relationship with respect to one another; and
  (2) correcting selected computed signals in response to the generated output signal.

22. The method of claim 21 wherein the step of correcting selected computed signals in response to the generated output signal comprises averaging selected ones of the derived signals and substituting the resulting averaged signal for selected computed signals.

References Cited

UNITED STATES PATENTS

| | | | |
|---|---|---|---|
| 3,166,709 | 1/1965 | Doll | 324—6 |
| 3,181,117 | 4/1965 | Sloughter | 324—1 XR |
| 3,230,445 | 1/1966 | Sloughter et al. | 324—6 |

GERARD R. STRECKER, Primary Examiner

U.S. Cl. X.R.

340—172.5